(12) United States Patent
Watts

(10) Patent No.: US 12,390,922 B2
(45) Date of Patent: *Aug. 19, 2025

(54) FOLDABLE MECHANIC'S CREEPER

(71) Applicant: Robert Dean Watts, Red Deer (CA)

(72) Inventor: Robert Dean Watts, Red Deer (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,613

(22) Filed: Feb. 11, 2023

(65) Prior Publication Data

US 2023/0191586 A1    Jun. 22, 2023

Related U.S. Application Data

(63) Continuation-in-part of application No. 17/400,143, filed on Aug. 12, 2021, now Pat. No. 11,795,720.

(60) Provisional application No. 63/064,910, filed on Aug. 12, 2020.

(51) Int. Cl.
*B25H 5/00* (2006.01)
*F16N 31/00* (2006.01)

(52) U.S. Cl.
CPC ............. *B25H 5/00* (2013.01); *F16N 31/004* (2013.01)

(58) Field of Classification Search
CPC ................................. B25H 5/00; F16N 31/004
See application file for complete search history.

(56) References Cited

U.S. PATENT DOCUMENTS

| | | | | |
|---|---|---|---|---|
| 1,256,783 | A | 2/1918 | Fuller | |
| 1,764,756 | A | 6/1930 | Slee | |
| D152,008 | S | 12/1948 | Lucas | |
| 2,996,150 | A * | 8/1961 | Cassem | F16N 31/006 238/14 |
| 3,984,116 | A * | 10/1976 | Bowers | B60B 29/00 280/32.6 |
| 4,671,024 | A * | 6/1987 | Schumacher | E04H 6/428 184/106 |
| 4,889,352 | A * | 12/1989 | Chamberlin, Jr. | B25H 5/00 280/30 |
| 4,909,524 | A * | 3/1990 | Paine | B25H 5/00 280/18 |
| 5,419,945 | A * | 5/1995 | Lopez | E04H 6/428 428/172 |
| 8,480,097 | B1 * | 7/2013 | Judge | B25H 5/00 280/18 |
| 9,303,816 | B1 * | 4/2016 | Browning | B65D 90/24 |

(Continued)

FOREIGN PATENT DOCUMENTS

FR    3072951    *    5/2019

*Primary Examiner* — Travis M Figg
(74) *Attorney, Agent, or Firm* — Sander R. Gelsing

(57) ABSTRACT

In one aspect there is provided a foldable creeper having a body comprised of a foldable material. The body has a first end, a second end and is foldable in a direction along a folding axis. The creeper further comprises a bottom, a raisable circumferential wall having first end portion, a second end portion, a first side wall and a second side wall, said first and second side walls running along axes that are substantially parallel to the folding axis. A first locking member and a second locking member are provided for supporting the first and second side walls. The first end portion, the second end portion and the first and second side walls are moveable relative to the bottom and cooperate to form a circumferential raised barrier around the periphery when the creeper is in an unfolded configuration.

9 Claims, 19 Drawing Sheets

(56) References Cited

U.S. PATENT DOCUMENTS

| | | | |
|---|---|---|---|
| 11,795,720 B2 * | 10/2023 | Watts | E04H 6/428 |
| 2012/0067897 A1 * | 3/2012 | Trinkel | F16N 19/00 |
| | | | 220/495.06 |
| 2021/0381642 A1 * | 12/2021 | Shimkonis | B65D 33/08 |

\* cited by examiner

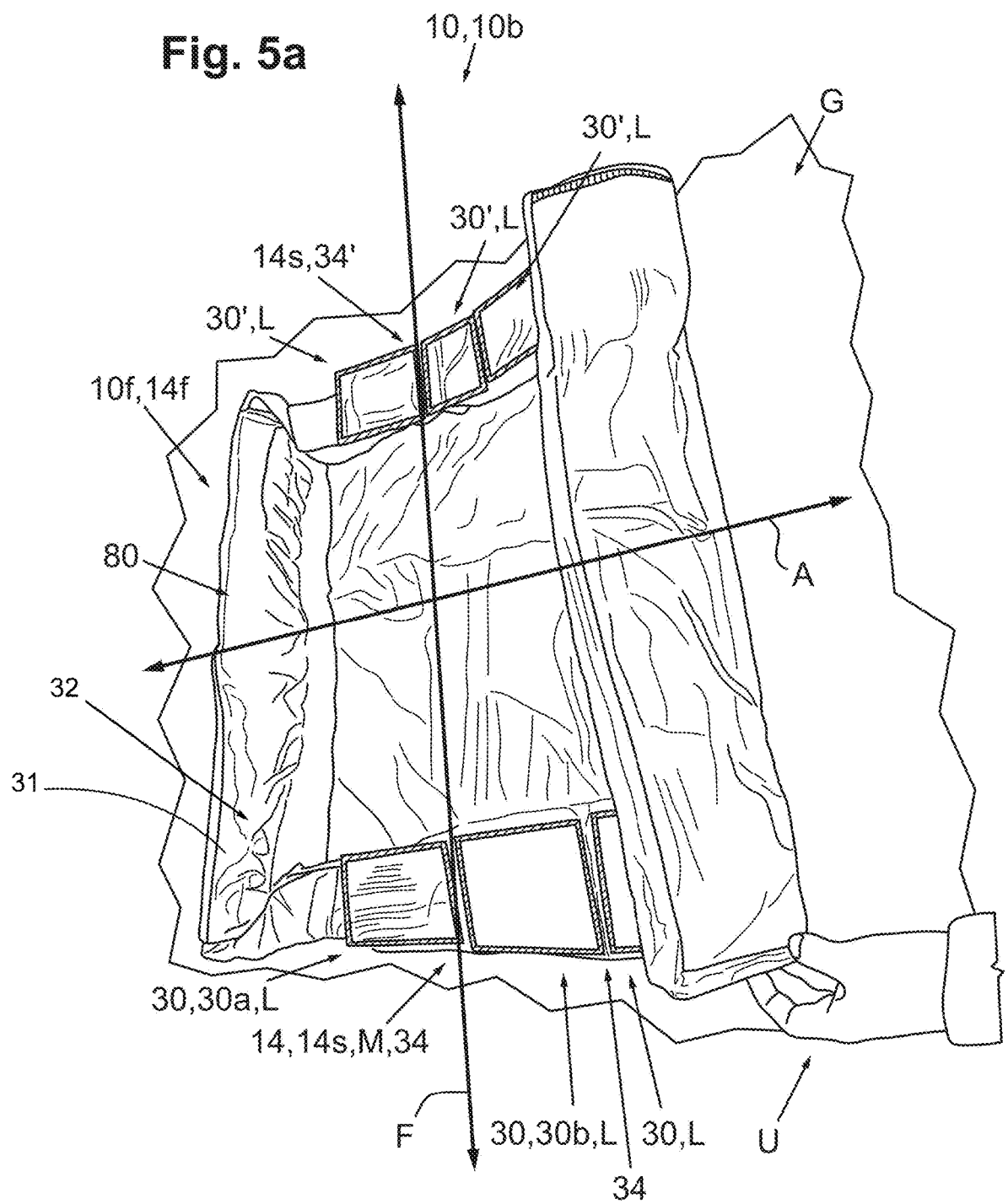

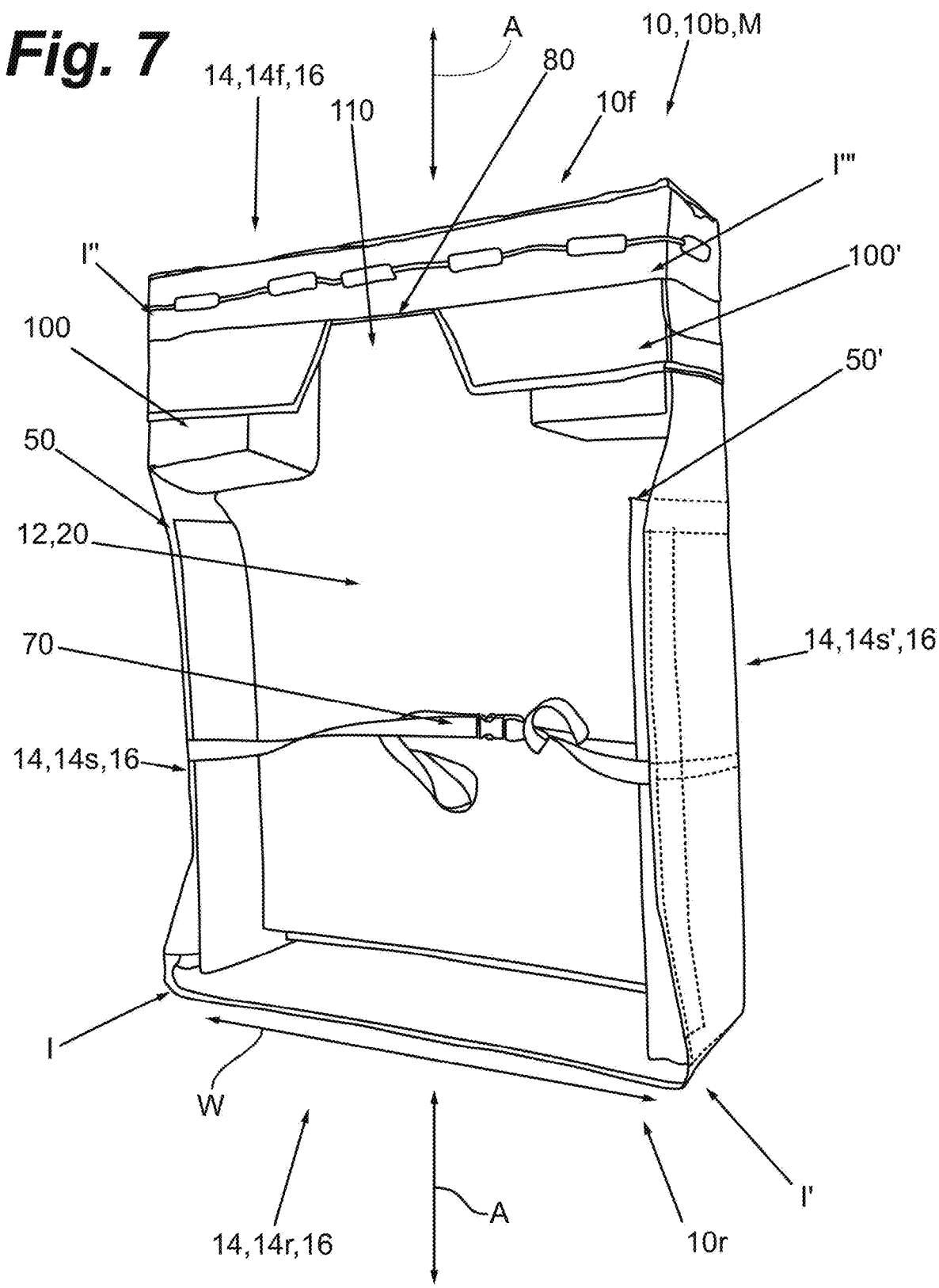

FOLDABLE MECHANIC'S CREEPER

CROSS REFERENCE TO RELATED APPLICATION

This application is a continuation-in-part of U.S. application Ser. No. 17/400,143, filed Aug. 12, 2021 and now U.S. Pat. No. 11,795,720, entitled "Foldable Mechanic's Creeper", which claims priority to, and benefit of, U.S. Provisional Patent Application Ser. No. 63/064,910 filed Aug. 12, 2020 and entitled, "Foldable Mechanic's Creeper", the entirety of each of which is incorporated herein by reference for all purposes.

FIELD OF THE INVENTION

This invention relates generally to ground mats, mechanic's creepers and mats for catching vehicle drippings. More particularly, the invention relates to foldable mechanic's creepers suitable to catch and contain liquid drippings from vehicles.

BACKGROUND OF THE INVENTION

The background information discussed below is presented to better illustrate the novelty and usefulness of the present invention. This background information is not admitted prior art.

Mechanics creepers for use by repair persons or mechanics are well known. They typically comprise a flat framework on rollers or casters, upon which a mechanic lies while working under an automobile or the like. However, such rollers or casters raise the framework (and the mechanic lying thereon) and such creepers are not ideal for use under vehicles having low ground clearance. Moreover, rollers and casters add to the overall complexity and cost of a mechanic's creeper.

Casterless creeper are also know, for example as disclosed in U.S. Pat. No. 1,764,756, by R. W. Slee, issued Jun. 17, 1930 for "Automobile Creeper." The creeper disclosed there comprises a flat body portion adapted to slide on the floor and ground, along with a head rest with rigid base extension for engagement by the head and body of a user to advance it on the floor or ground. That creeper was built rigid cellular board having longitudinal corrugations left open at their ends for draining any water or oil out of the creeper. However, allowing water and oil to drain out of a creeper is often undesirable, e.g. in the case of oil changes where any spilled oil can ruin a garage floor or create environmental damage. Moreover, the rigid flat body of the creeper taught by Slee makes storing it more challenging as compared to a creeper that can be collapsed or folded. These prior-art creepers are also not suitable for use in outdoor winter scenarios, such as when there is a significant amount of snow on the ground; their casters get jammed and ice logged in snow, while having open ends for draining will result in snow getting on the inside of the creeper and onto a user.

Therefore, what is needed is a creeper or ground mat that does not suffer from these aforedescribed limitations.

SUMMARY OF THE INVENTION

In an embodiment of the invention, there is provided a foldable creeper comprising a foldable body comprised of a foldable material. The foldable body has a first end, a second end and is foldable in a direction along a folding axis. The creeper further comprises a bottom, a raisable circumferential wall having first end portion, a second end portion, a first side wall and a second side wall, said first and second side walls running along axes that are substantially parallel to the folding axis, a first locking member and a second locking member. The first end portion, the second end portion and the first and second side walls are moveable relative to the bottom and cooperate to form a circumferential raised barrier around the periphery thereof when the creeper is in an unfolded configuration.

In a preferred embodiment of the invention the foldable material is capable of containing water, oil and other liquids that may drain or leak out of a motor vehicle and when in the unfolded configuration and used underneath the motor vehicle, the bottom and the circumferential raised barrier cooperate to create a liquid catching basin.

In a further preferred embodiment of the invention the first and a second locking members can act to maintain the first and second side walls in a raised and upright position when the creeper is in the unfolded configuration.

BRIEF DESCRIPTION OF THE DRAWINGS

Referring to the drawings, several aspects of the present invention are illustrated by way of example, and not by way of limitation, in detail in the figures, wherein:

FIGS. 5a to 5f are additional perspective views of the foldable creeper of FIG. 1, showing it being folded into a folded configuration;

FIG. 7 is a perspective view of yet another embodiment of a foldable creeper, shown in an unfolded configuration;

DETAILED DESCRIPTION OF THE PREFERRED EMBODIMENTS

Figure 1:
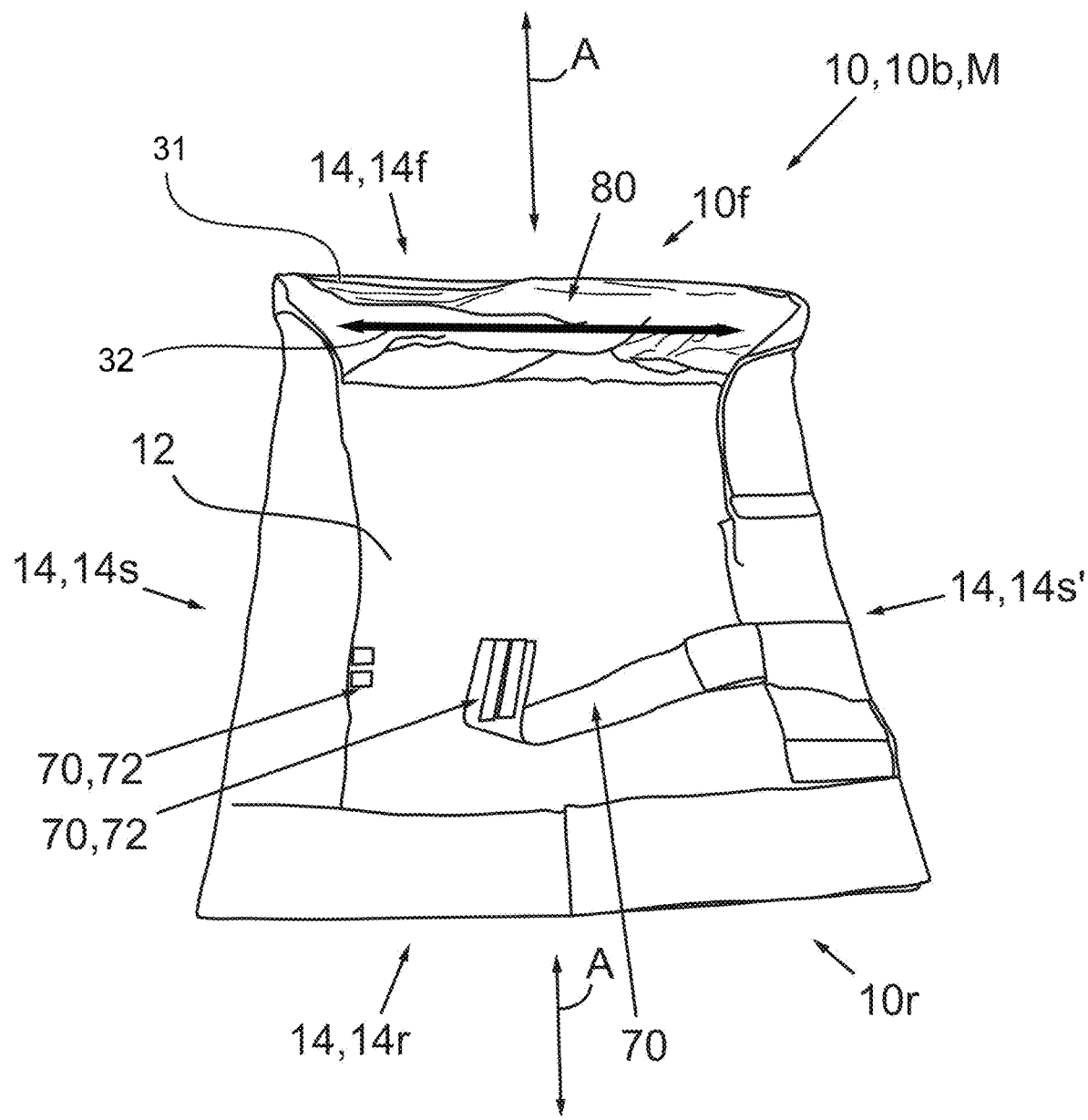
FIG. 1 is a perspective view of one embodiment of a foldable creeper, shown in a mostly unfolded configuration.

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Referring generally to the figures, the foldable creeper 10 preferably comprises a foldable body 10b having a first or front end 10f and a second or rear end 10r. The body 10b is foldable in a direction along a folding axis A, which preferably runs substantially perpendicular to the axis of the front and rear ends 10f, 10r; i.e. so that the creeper 10 can be folded from rear to front (or vice versa); see FIGS. 4a to 4c. The creeper 10 can therefore be in a folded configuration (e.g. FIGS. 4c and 5f), an unfolded configuration (e.g. FIG. 2) and various partially folded configurations therein in-between.

Figure 2:
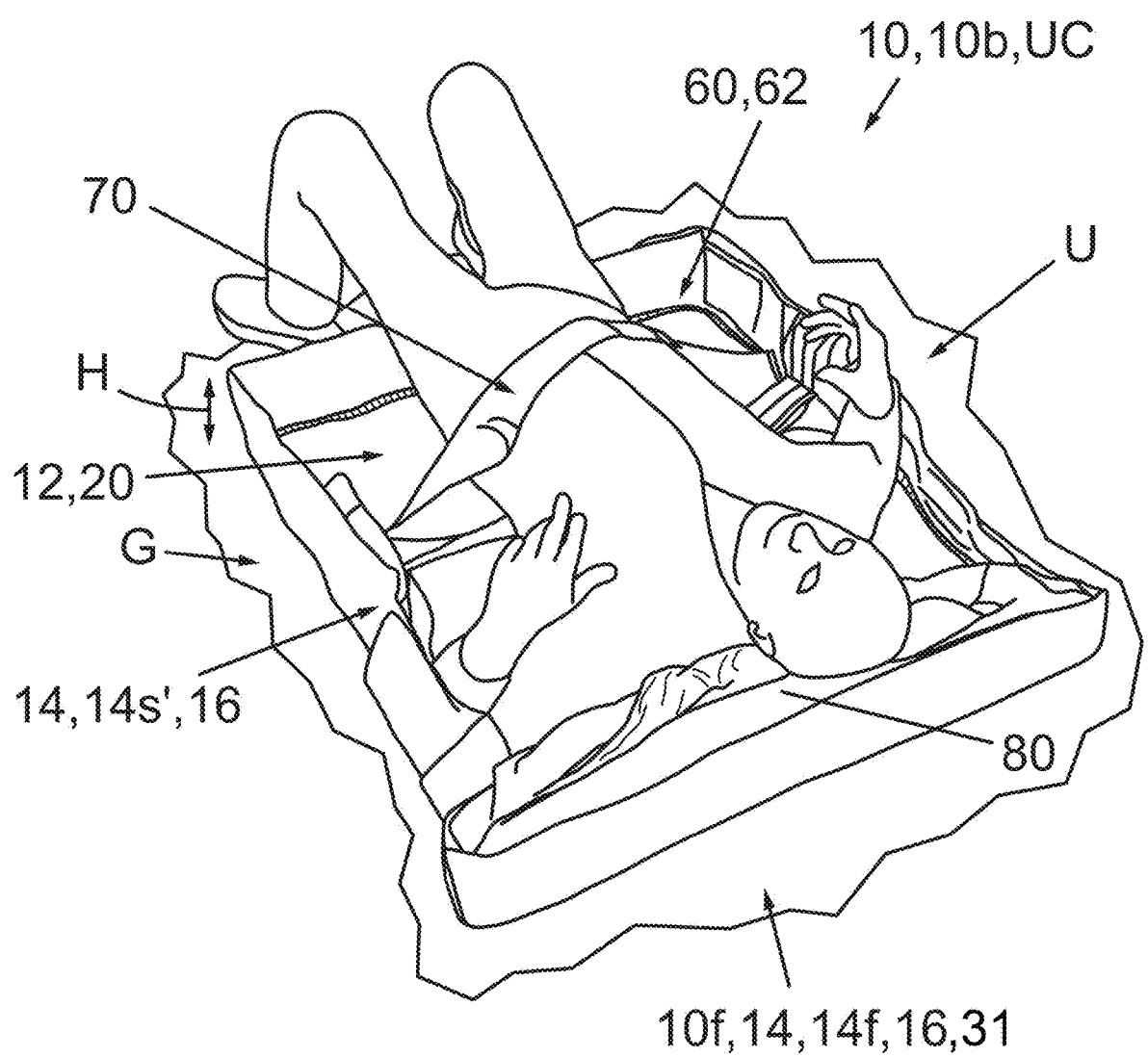
FIG. 2 is another perspective view of the foldable creeper of FIG. 1, shown in an unfolded configuration and in use by a user.

The terms "front" and "rear" are used herein as respective references to the orientation of the foldable creeper 10 when used by a user U, wherein the "front" end will be that end where the user U may place his or her head (see FIG. 2), and wherein the "rear" end will be that end where the user may place their legs (or drape their legs over such end; e.g. FIG. 2). However, there may be other uses and/or different orientations for the foldable creeper 10 when the terms "front" and "rear" may not apply and wherein the terms "first" and "second" ends are more appropriate.

The body 10b preferably comprises a bottom 12 and an upturnable or raiseable circumferential wall 14, i.e. where wall 14 may be folded against the bottom (as can be seen in FIG. 1) or upturned away from the bottom 12 (as can be seen in FIG. 2). The bottom 12 is preferably substantially planar when in the unfolded configuration. The bottom end of the circumferential wall 14 is preferably joined to (or integral with) the bottom 12, and it can form a substantially raised circumferential barrier 16 when in the unfolded configuration, i.e. when upturned, raised or "popped up" relative to the planar bottom 12; see FIG. 2.

Preferably the body 10b is constructed from a flexible and foldable material M which is water-proof and suitable to contain water, oil and other liquids that may drain or leak out of motor vehicles (such as antifreeze, brake fluid and power steering fluid). The embodiment of FIGS. 1 to 5f is constructed from a polyethylene material (similar to that used to make tarps). However, other materials, such as flexible rubber or water-proof cloth will also be suitable to construct the body 10b, so long as the body 10b remains foldable in a direction along the folding axis A.

The circumferential wall 14 further comprises a first or front-end portion 14f (at the front end 10f), a second or rear-end portion 14r (at the rear end 10r), a first side wall 14s and a second side wall 14s'. Preferably, the side walls 14s, 14s' run along an axis that is substantially parallel to the folding axis A, and substantially perpendicular to the front-end portion 14f and rear-end portion 14r. Additionally, when the creeper 10 is in the unfolded configuration, the front-end portion 14f, rear-end portion 14r and side walls 14s, 14s' are raised (upturned or pivoted) relative to the bottom 12 and cooperate to form the circumferential raised barrier 16 around the periphery of said bottom 12.

Advantageously, when in the unfolded configuration and used underneath a vehicle, the bottom 12 and the circumferential raised barrier 16, cooperate to provide a liquid catching basin 20 to catch any oil, water or other liquid that may come off of such vehicle and which might otherwise ruin a garage floor or create environmental damage. Preferably, the circumferential raised barrier 16 is at least 2 inches in height H above the bottom 12 (when raised). More preferably, the circumferential raised barrier 16 is 6 inches in height H above the bottom 12, so as to allow the creeper 10 to be used in snow covered ground scenarios and the like, and thereby preventing said snow from falling from the outside into the basin 20.

It is to be understood that if sufficient tension was provided to the circumferential wall 14, it could be maintained in a raised position (relative to the bottom 12) and maintain the substantially raised circumferential barrier 16. However, to further assist the circumferential wall 14 in forming and maintaining the substantially circumferential raised barrier 16 (when the creeper 10 is in the unfolded configuration), the creeper 10 preferably comprises a plurality of rigid panel members 30 positioned at panel locations L along or within the circumferential wall 14. The rigid members 30 may be comprised of cardboard, plastic, wood or other rigid material suitable to maintain the flexible and foldable material M in an upright and raised manner (relative to the bottom 12) when the creeper 10 is in the unfolded configuration. In a preferred embodiment, the panel members 30 are 6 inches in height and between 8 to 10 inches in length. Advantageously, the panel members 30 being rigid, maintain the flexible and foldable material M of the circumferential wall 14 in a raised and upright position, when the creeper 10 is in the unfolded configuration, thereby establishing the liquid catching basis 20 (see FIG. 2). Panel members 30 may also be of other suitable dimensions, such as 2 inches in height and between 4 to 8 inches in length.

In the embodiment of FIGS. 1-5f, the circumferential wall 14 is preferably manufactured by folded-over section (dual layer) of polyethylene material, and the rigid panel members 30 are placed therewithin at the various panel locations L during manufacturing. As such they are not visible when the creeper 10 is viewed by a user U. The panel members 30 are therefore schematically illustrated in the figures by means of white outlined rectangles labelled 30 (e.g. as in FIG. 5a). In other embodiments (not shown), the circumferential wall 14 may be provided with pockets or sleeves to receive the rigid panel members 30 at the panel locations L. In still other embodiments (not shown), the rigid panel members 30 may be attached to the circumferential wall 14 at the locations L (e.g. either to the inside or outside portions of said wall 14), such as by gluing, stapling, or via a removable attachment means such as a VELCRO™ brand hook and loop fastener.

Preferably, a single rigid panel member 31 is provided in, or on, each of the front-end and rear-end portions 14f, 14r of the circumferential wall 14, extending substantially along said front-end and rear-end portions 14f, 14r between the side walls 14s, 14s'. More preferably, the single rigid panel member 31 at the first end 14f may be further reinforced with a secondary bar or support member 32 (e.g. within the front-end portion 14f). Advantageously, such a support member 32 can support the single rigid panel member 31 and will allow a user U to push the front end portion 14f with their head through snow, mud or the like, and still maintain said front-end portion 14f in a substantially upright manner (as it is supported by said support member) thereby maintaining the integrity of the liquid catching basin 20. Moreover, since the folding axis A is perpendicular to said front-end and rear-end portions 14f, 14r, these portions 14f, 14r (and any associated support member or bar) will not need to be folded on top of themselves. In the embodiment of FIGS. 1-5f, only the side walls 14s, 14s' are folded on top of themselves; see FIGS. 4a-5f.

The rigid panel members 30 are preferably provided in a serial (end-to-end), non-overlapping manner along each of the first and second side walls 14s, 14s' as shown in FIGS. 5a-5d. More preferably, the rigid panel members 30 along the first side wall 14s are provided at panel locations L that substantially mirror the placement and locations of corresponding panel members 30' positioned along the second side wall 14s', see FIG. 5a.

More preferably, at the interface (or meeting point) of adjacent panel member (e.g. 30a, 30b in FIG. 5a) a small portion of the flexible and foldable material M of the circumferential wall 14 is left unsupported by any rigid member 30 (e.g. 4 inch width of foldable material M between adjacent sections) so as to define a folding section 34. When this is done, corresponding folding sections 34, 34' on each of the first and second side walls 14s, 14s' will substantially align and, given their flexible and foldable nature (and the flexible and foldable nature of the bottom 12), provide one or more fold axes F, F', F" that run therebetween and which are aligned substantially perpendicular to the folding axis A. The body 10b may be folded at one or more of the fold axes F, F', F", so that the creeper 10 can be folded from rear to front in a direction along folding axis A (or vice versa); see FIGS. 4a to 5f. Similarly, end-fold axes FE, FE' may be provided at each of the first and second ends (10f, 10r) and preferably also comprise a small portion of the flexible and foldable material M of the circumferential wall 14 which is unsupported by any rigid member 30. The first and second end wall portions 14f, 14r may be folded about their respective end-fold axes FE, FE' towards (or away from) the bottom 12.

Each of the first and second side walls 14s, 14s' are preferably provided with a flexible folding segment 40 at each end of said side walls 14s, 14s', i.e. where the side walls 14s, 14s' meet the front-end and rear-end portions 14f, 14r (see FIG. 3c, 3d, 4a, 5a). The flexible folding segment 40 is therefore a section of the side walls 14s, 14s' that is unsupported by a rigid panel member, and is able to fold on itself, thereby aiding the raising/lowering of the circumferential wall 14 relative to the bottom 12; see FIG. 4a.

Preferably, a pivotable, rigid and substantially planar locking member 50 is provided for supporting the one or more flexible folding segments 40 when the creeper 10 is in the unfolded configuration UC. In the embodiment of FIGS. 1-5f, two pivoting, locking members 50 are provided on the inside of the rear-end portion 14r, mounted at the interface or connection between the rear-end portion 14r and the side walls 14s, 14s'; see FIGS. 3a-3d.

Figure 3A:
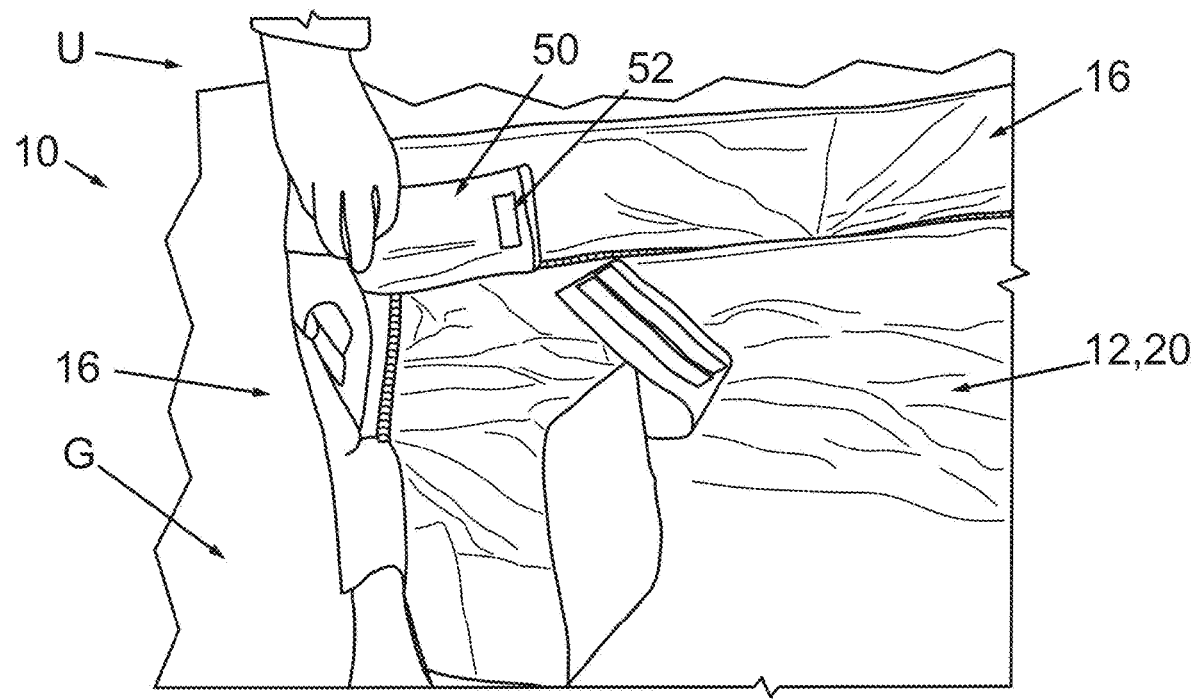
FIGS. 3a to 3d are perspective views of the foldable creeper of FIG. 1, showing a locking member next to a flexible folding segment.
Figure 3B:
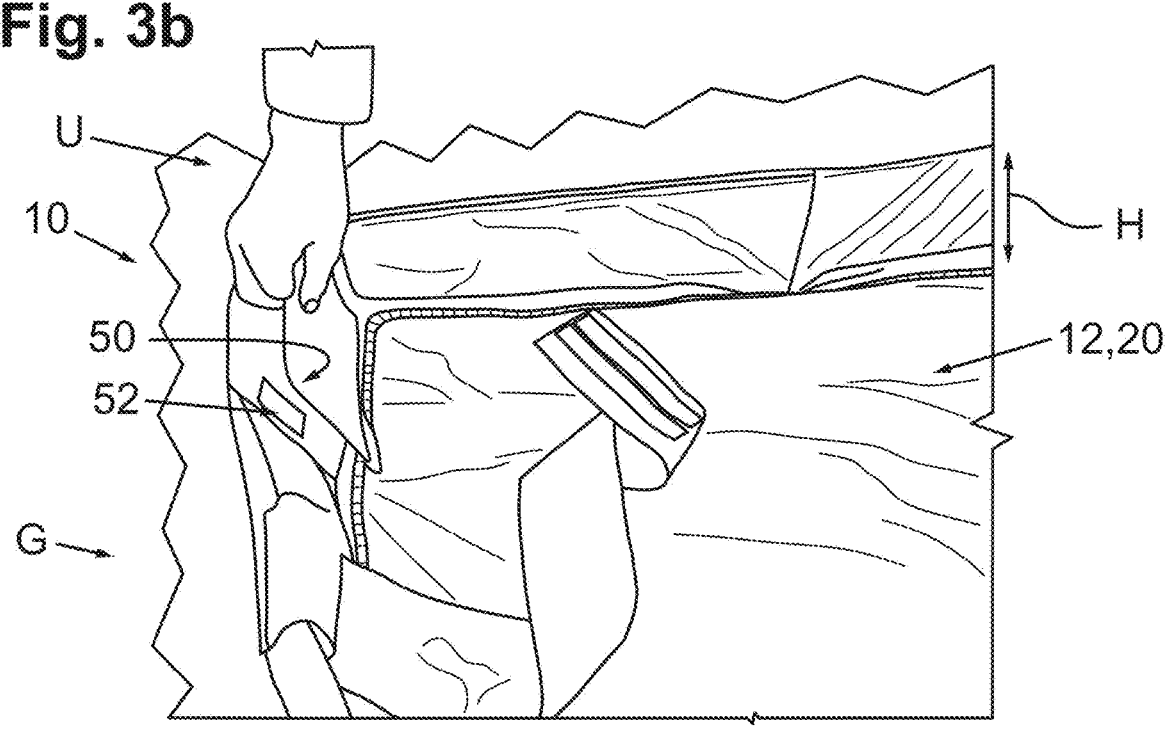
Figure 3C:
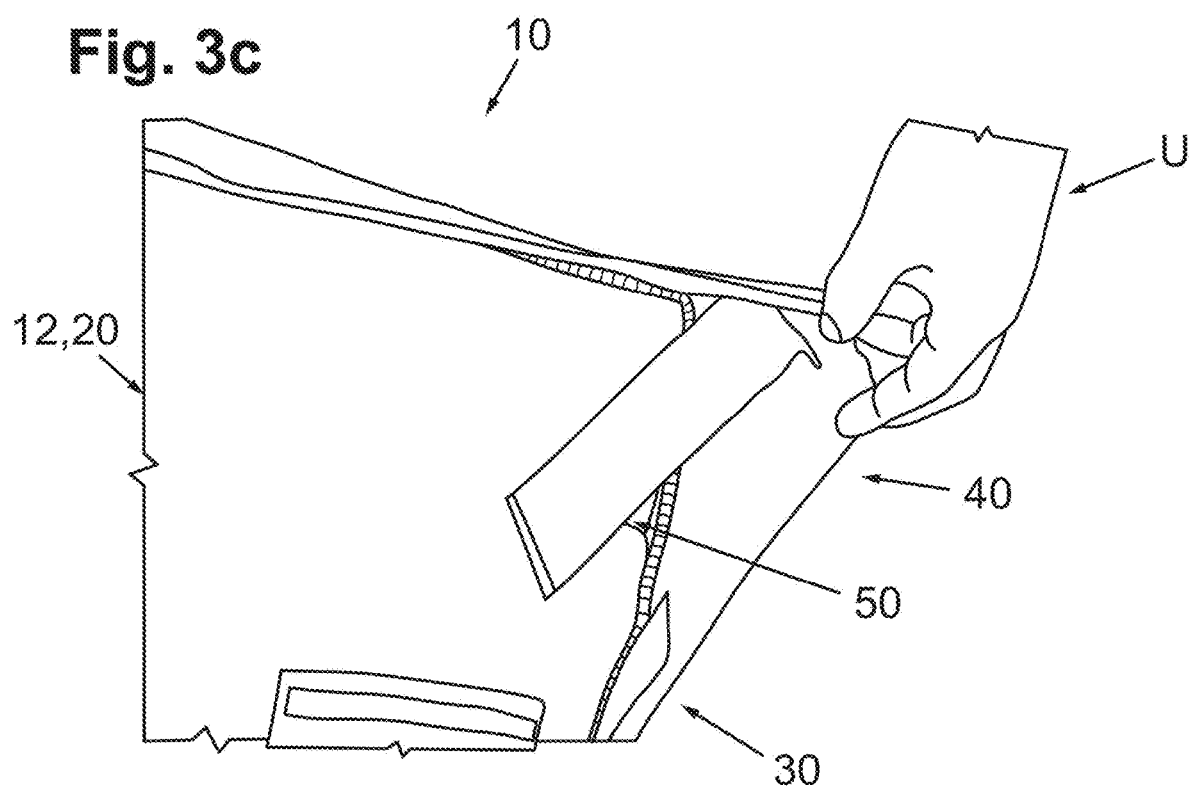
Figure 3D:
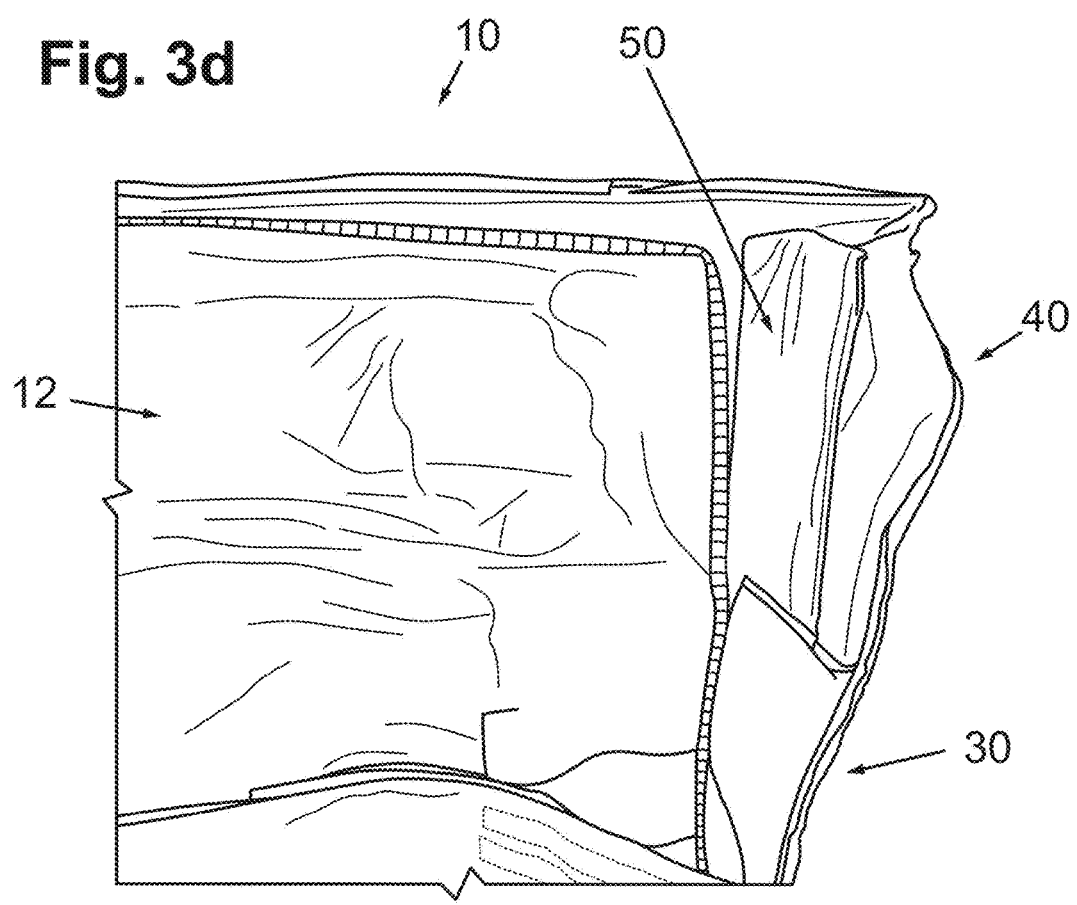

In this embodiment, the locking members 50 can pivot between a storage configuration (wherein they are substantially parallel to the rear-end portion 14r and do not interfere with the folding of the creeper 10 along the folding axis A, see FIG. 3a) and a supporting configuration (where they are substantially parallel to the folding segments 40 and supporting said segments 40 in a raised position when the creeper 10 is in the unfolded configuration, see FIG. 3d). A removable attachment 52 means, such as a VELCRO™ brand hook and loop fastener, may be provided to retain the locking members 50 in the supporting configuration.

Figure 4A:
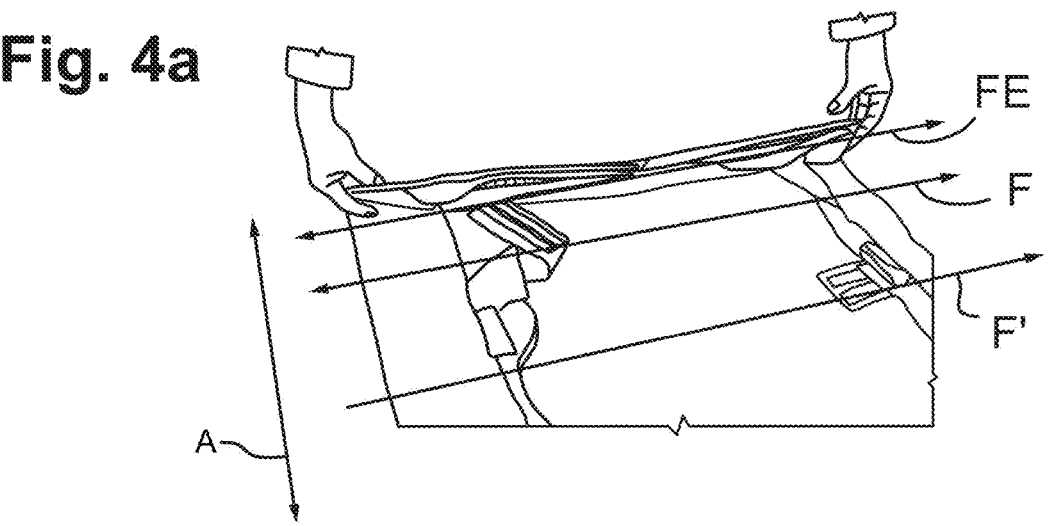
FIGS. 4a to 4c are perspective views of the foldable creeper of FIG. 1, showing it being folded into a folded configuration in an end-over-end manner.
Figure 4B:
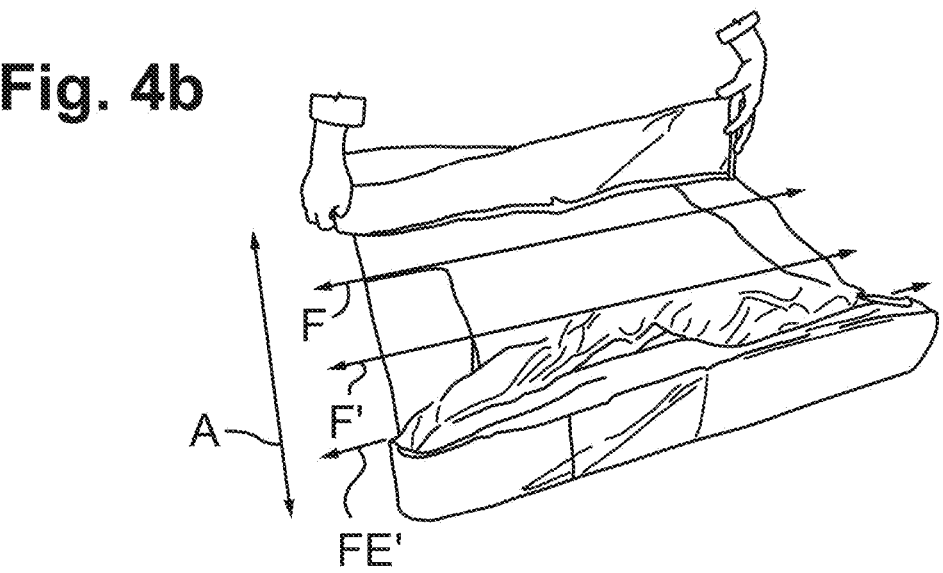
Figure 4C:
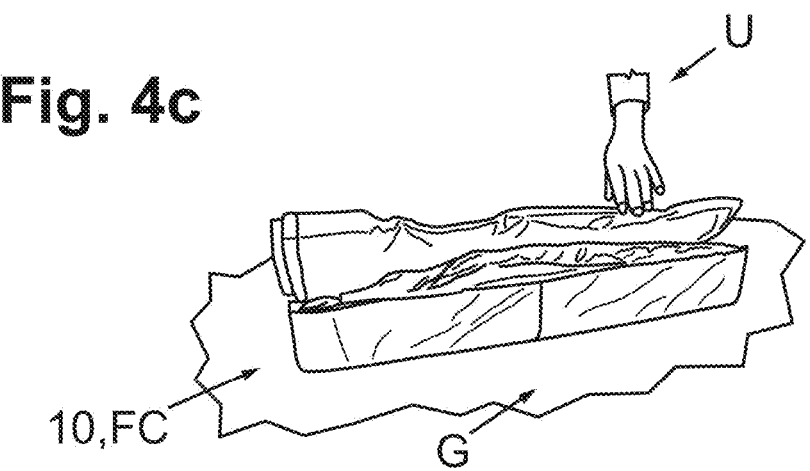
Figure 5B:
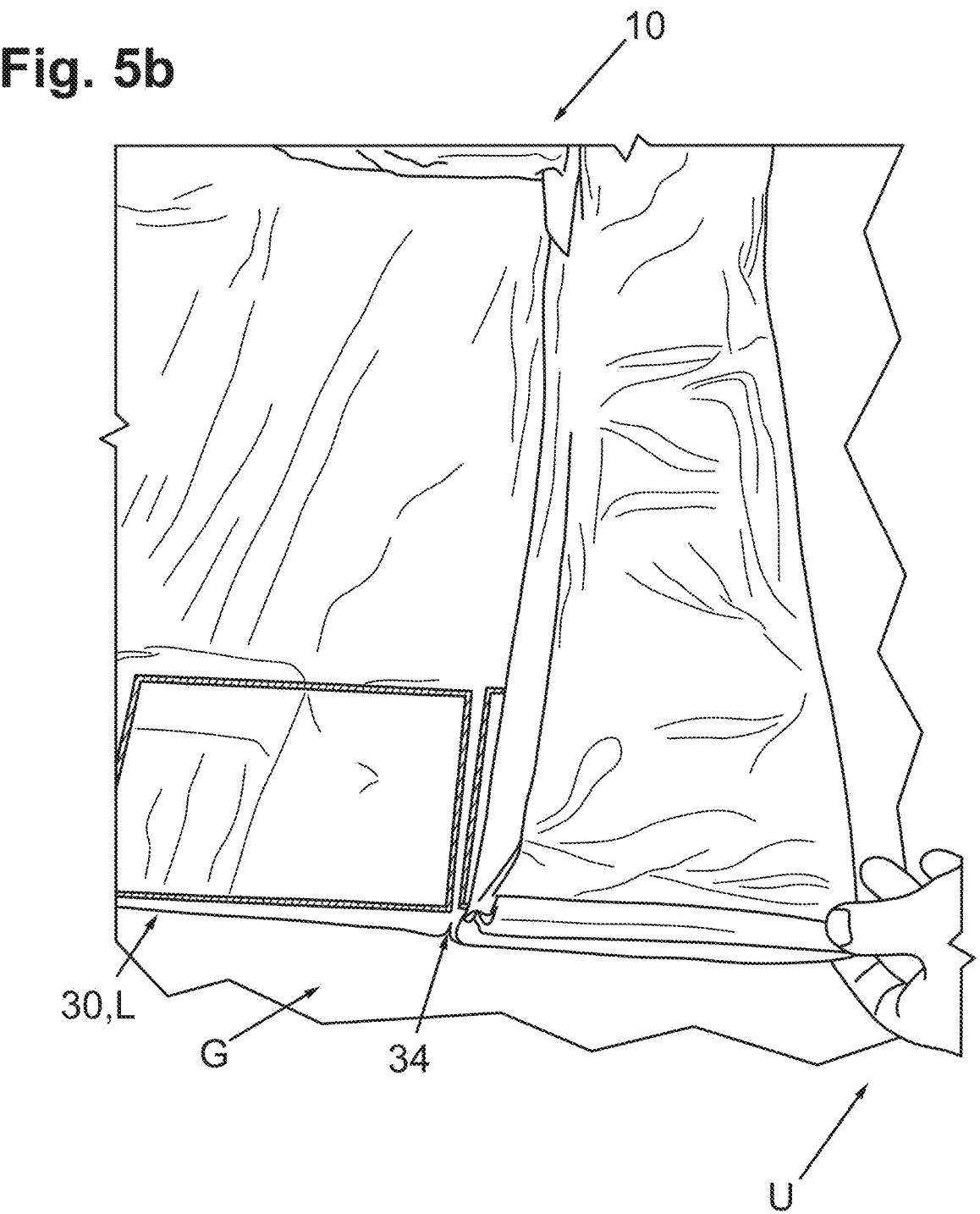
Figure 5C:
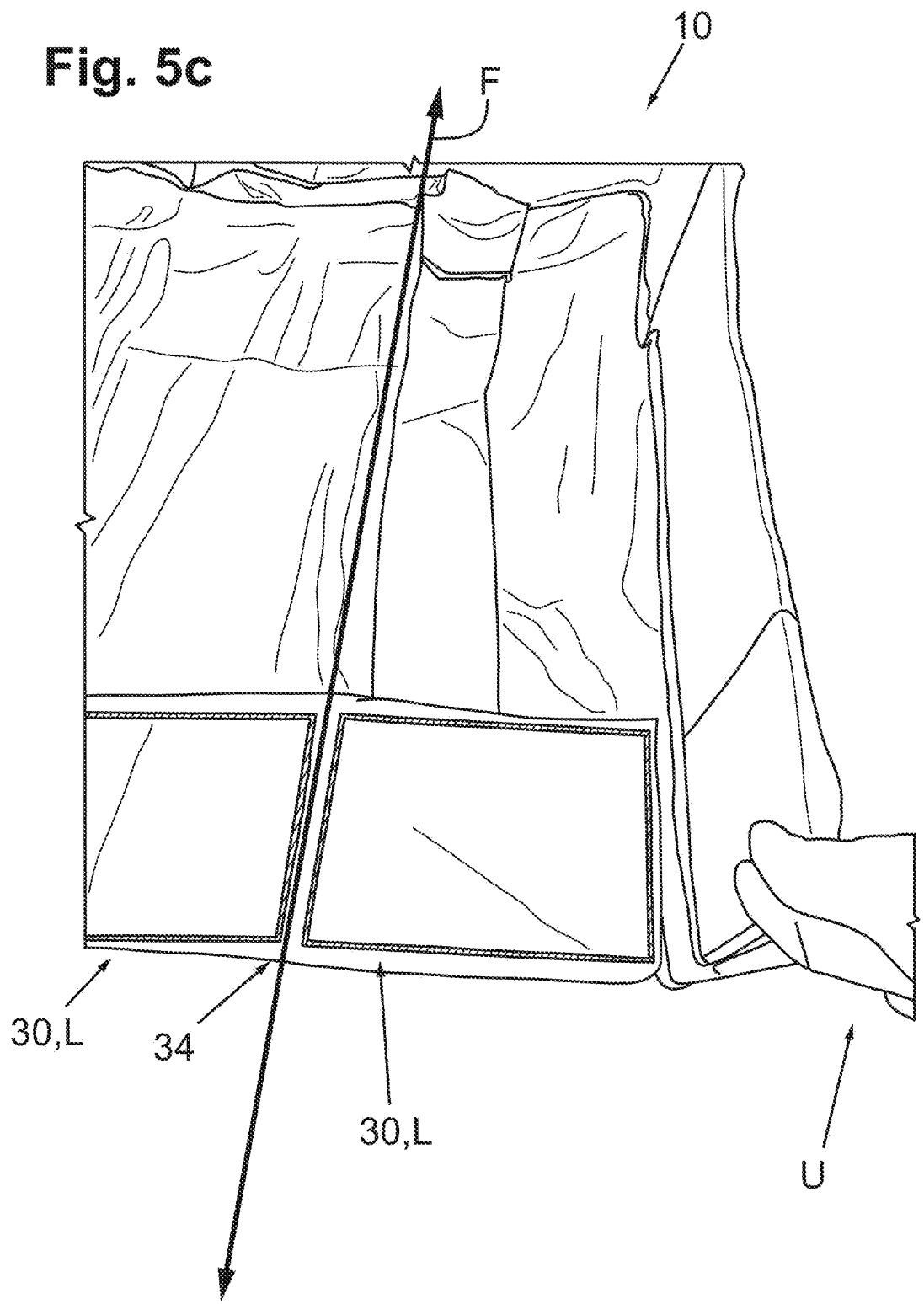
Figure 5D:
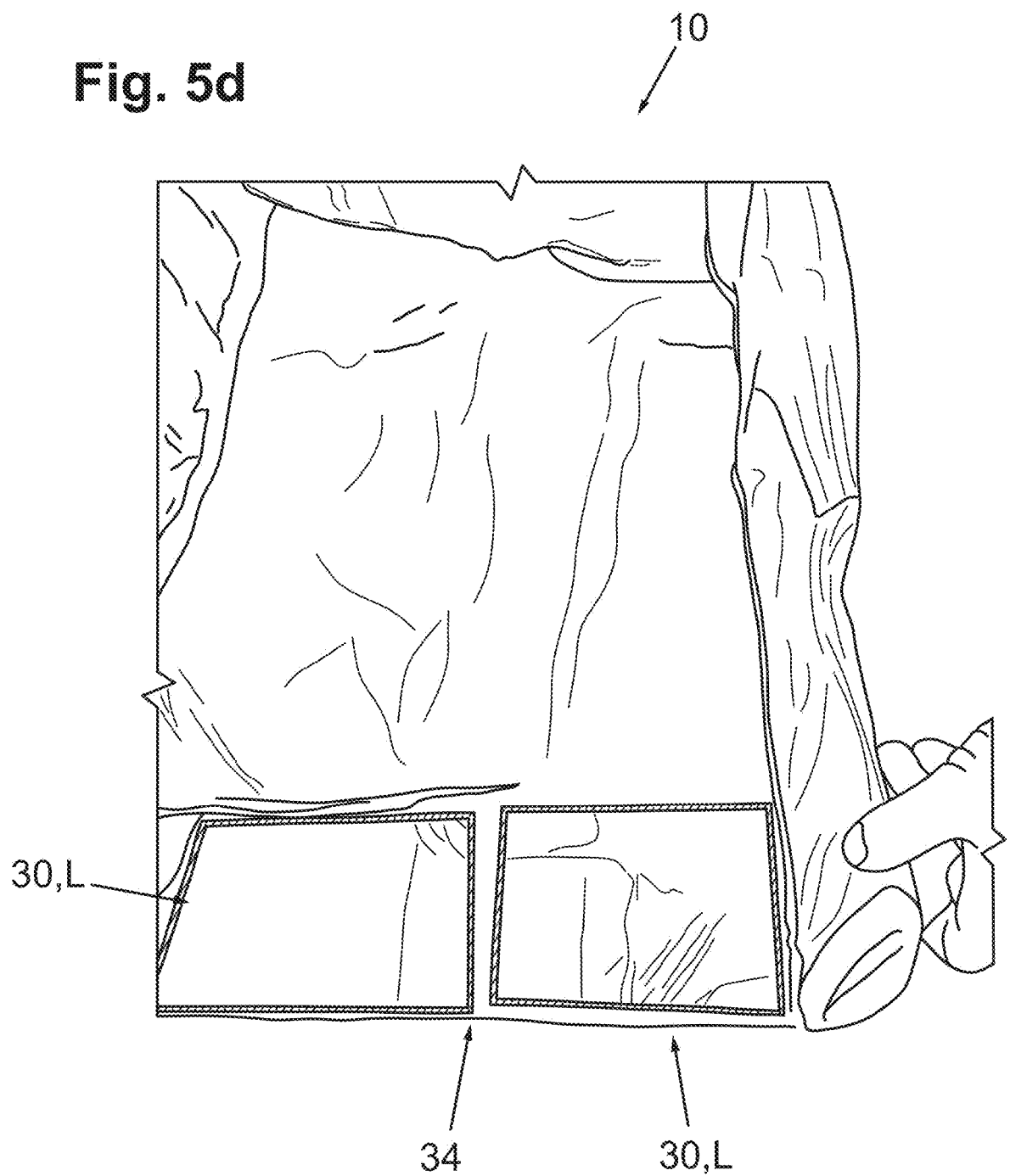
Figure 5E:
Figure 5F:
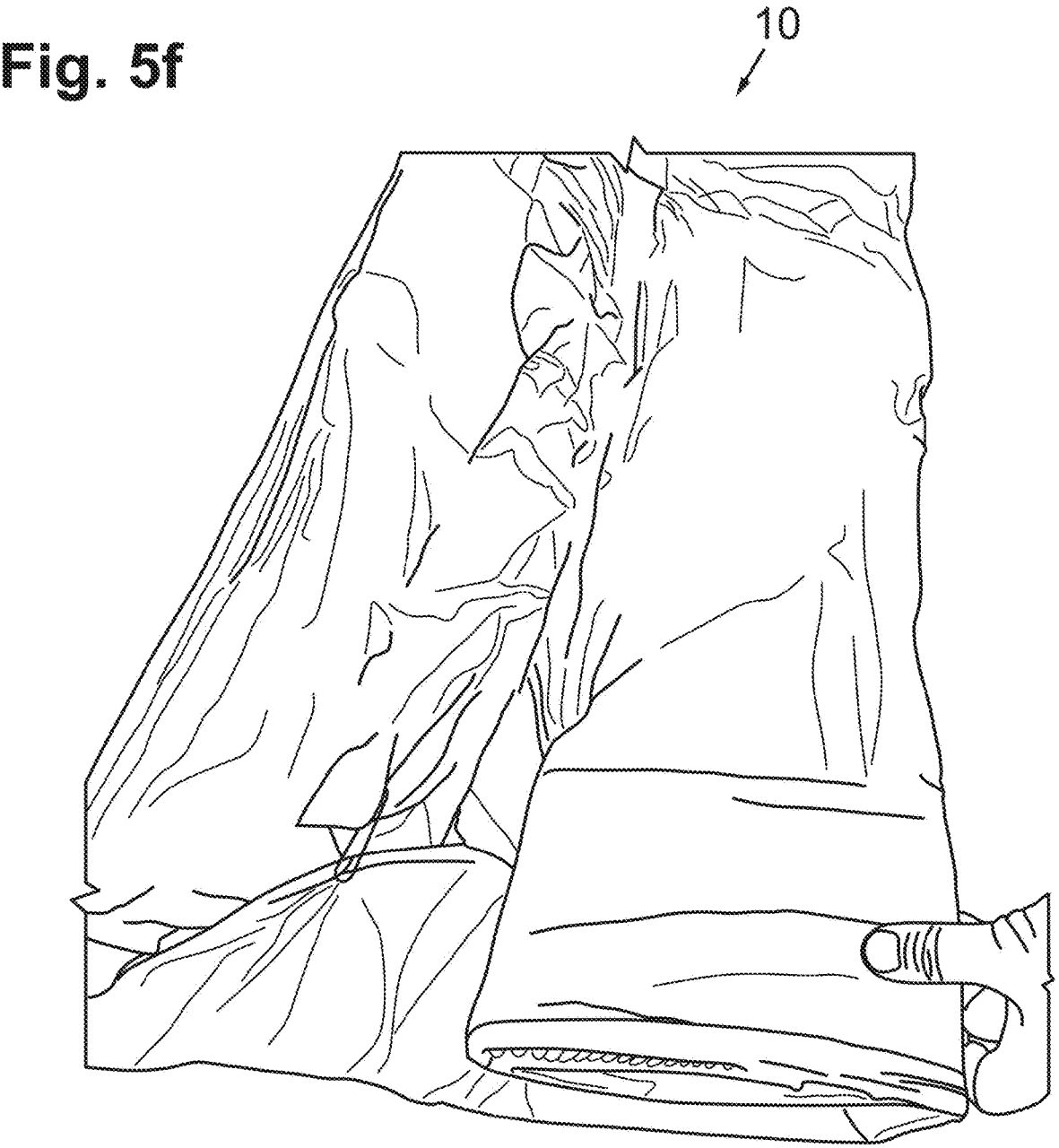
Figure 6A:
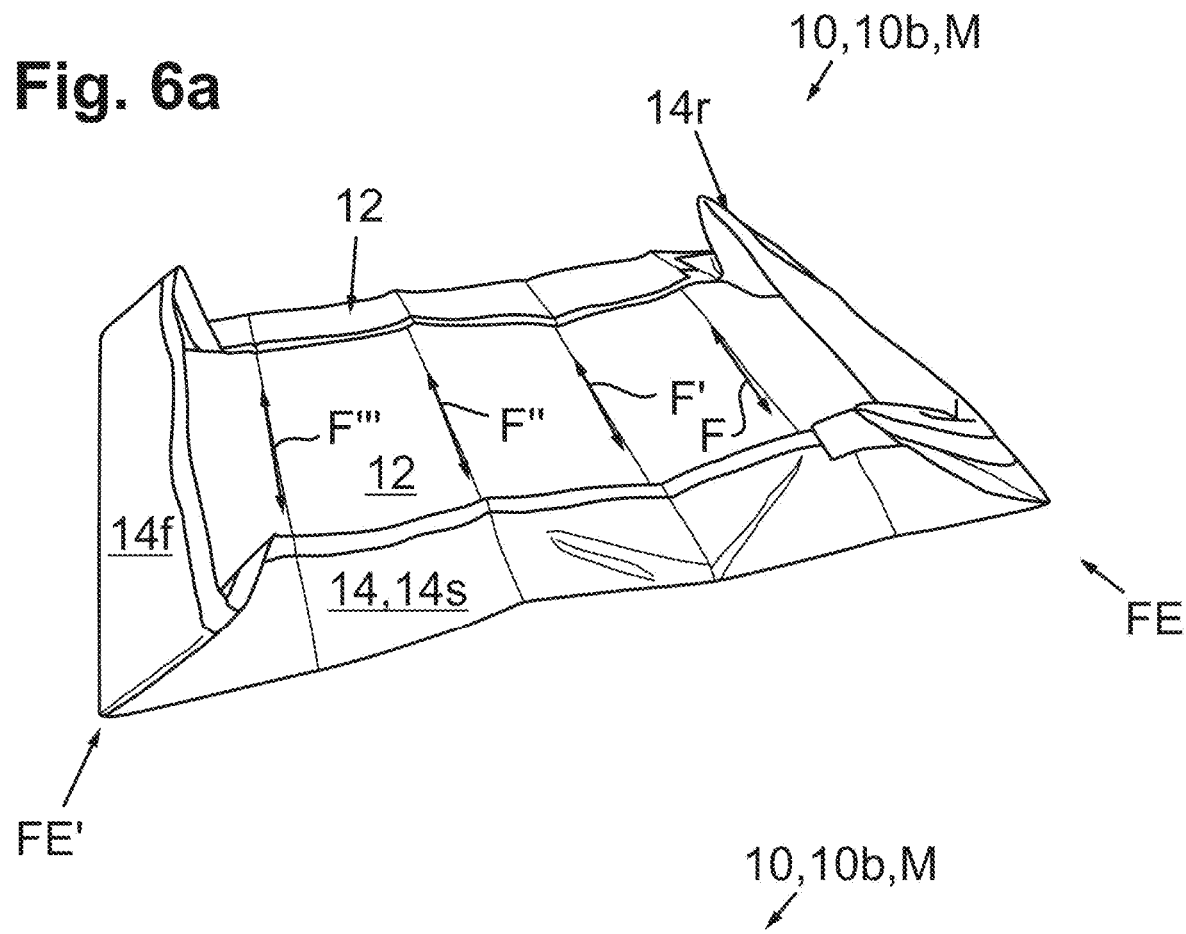
FIGS. 6a to 6e are perspective views of another embodiment of the foldable creeper, showing it being folded into a folded configuration in an accordion-like manner.
Figure 6B:
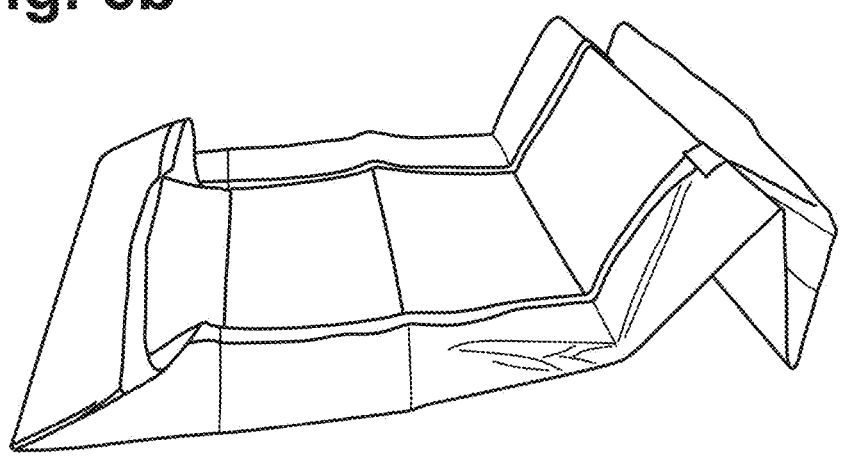
Figure 6C:
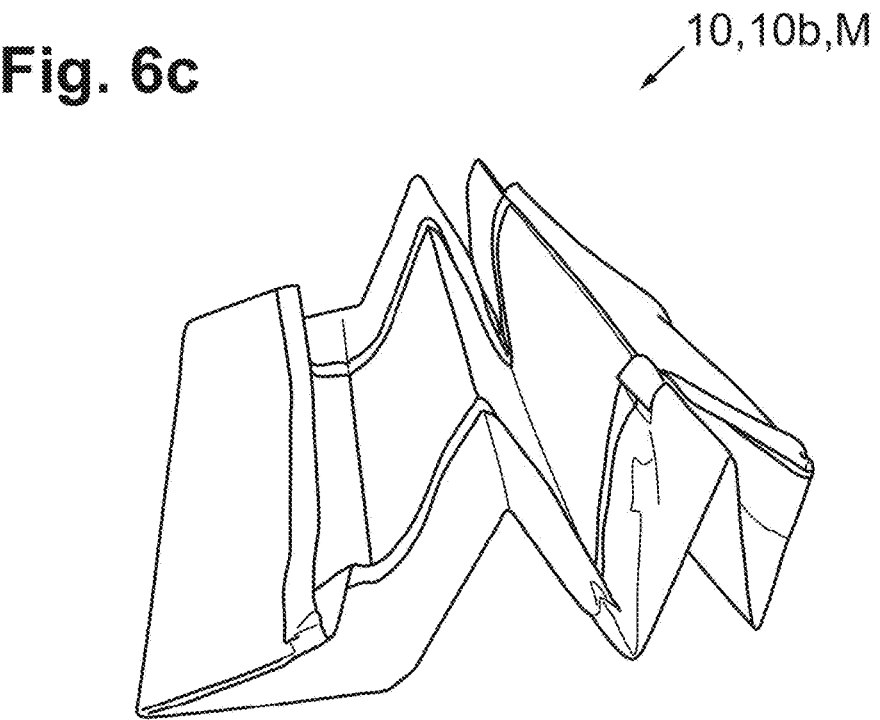
Figure 6D:
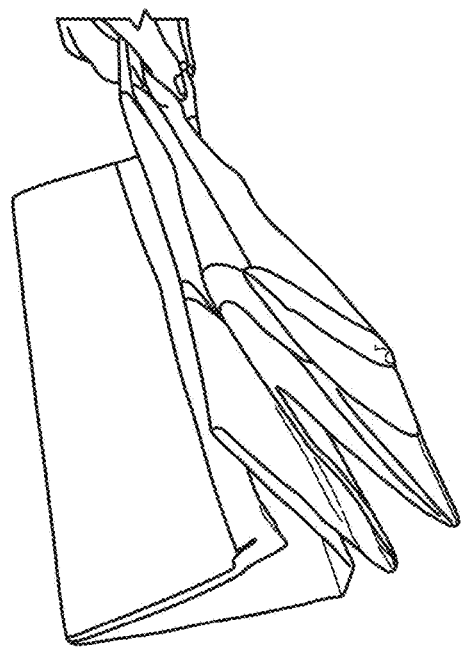
Figure 6E:
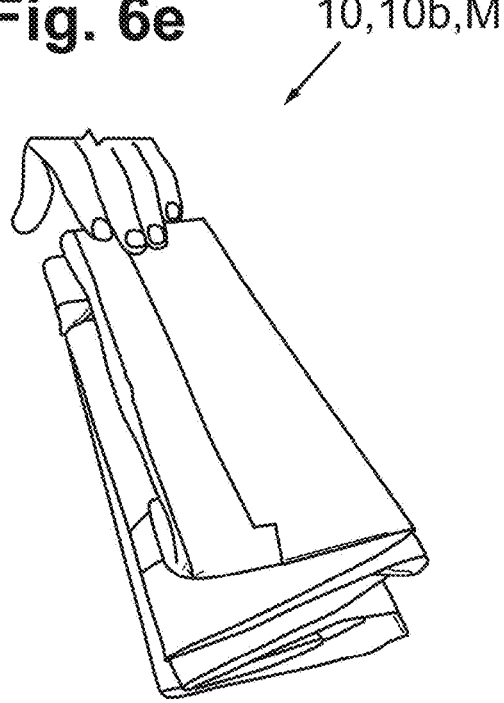

Folding and unfolding the creeper 10 between the unfolded configuration UC and folded configuration FC may be done in an end-over-end manner as shown in FIGS. 4a to 4c. Or the creeper may be folded and unfolded in an alternating manner, i.e. to create an accordion-like fold, as shown in FIGS. 6a to 6e. Advantageously, when folded and unfolded in the accordion-like manner illustrated in FIGS. 6a to 6e, the exterior surface of the bottom 12 does not touch the interior surface of the bottom 12 (as is the case when folding end-over-end). More advantageously, any snow or mud that might be attached to the exterior surface of the bottom 12 will not be introduced onto the interior surface of the bottom 12, allowing said interior surface to remain dry and uncontaminated by such snow or mud, and reducing the amount of cleaning of the creeper 10 for any subsequent use by a user U.

Preferably, the creeper 10 further comprises a light source 60 and associated power source (not shown), such as a flexible and foldable LED light strip 62 mounted around the periphery of the bottom 12 (see FIG. 2). Advantageously, the foldable LED light strip can be folded with the creeper 10 along the fold axis F. More advantageously, the light source 60 will assist a user U working underneath a vehicle or the like by illuminating the working area.

More preferably, the creeper 10 further comprises a strap 70 to fasten a user U to the creeper 10 when in use. The strap 70 is preferably provided with a removable attachment means 72, such as a VELCRO™ brand hook and loop fastener to fully, or partially, remove the strap 70 from the creeper 10 and/or adjust the strap's length to accommodate different sized users.

Even more preferably, the front-end portion 14f further comprises a cushioned or padded head rest 80 and head strap to support, and strap to, a user's head while using the creeper 10. The head rest 80 is preferably supported by the support bar 32. Additionally, the light source's power source may comprise a small battery and associated circuitry that is mounted within or adjacent the head rest 80, or on the support bar 32. Still even more preferably, the bottom 12 is of sufficient dimensions and surface area (when in the unfolded configuration) to allow a user's head, torso and hips to be supported thereupon, while also allowing a user's legs to extend or drape over the rear-end 10r; see FIG. 2. Advantageously, a user U can strap themselves into the creeper 10 using the strap 70 and any head strap, extend their legs over the rear-end 10r, and push against the ground G with their legs and exert a force against the front-end 10f to move or advance the creeper 10 forward across the ground G. Advantageously, the side walls 14s and basin 20 will function not only to contain any oil, water or other liquid that may come off of a vehicle, but will also push any snow or mud that may be on the ground G away from the creeper's interior, thereby keeping a user U dry and clean.

Additional Embodiment

Referring to FIGS. 7-10 another embodiment of a foldable creeper 10 is shown. As with the previous embodiments, the foldable creeper 10 of this embodiment preferably comprises a foldable body 10b having a first or front end 10f and a second or rear end 10r. The body 10b is foldable in a direction along a folding axis A, which preferably runs substantially perpendicular to the axis of the front and rear ends 10f, 10r; i.e. so that the creeper 10 can be folded from rear to front (or vice versa). The creeper 10 can therefore be in a folded configuration, an unfolded configuration (e.g. FIGS. 7, 8c and 10) and various partially folded configurations therein in-between (e.g. FIGS. 8a-8b)

Figure 8A:
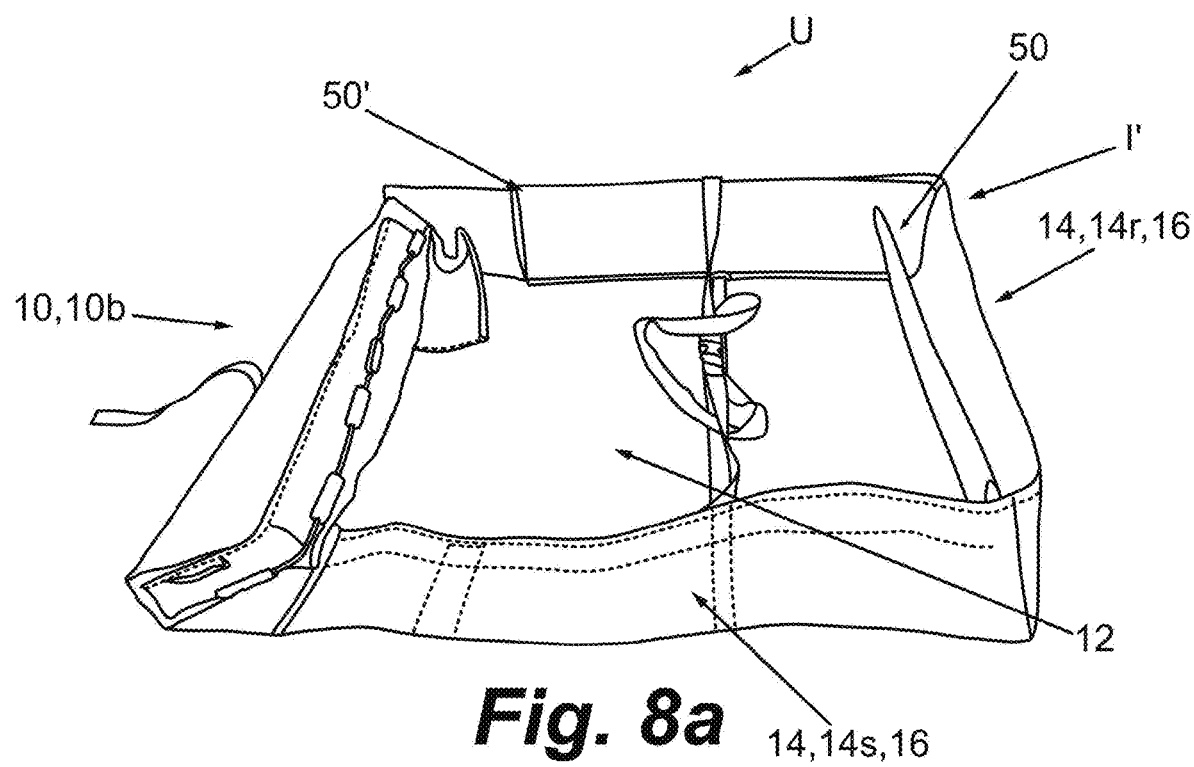
FIGS. 8a-8c are perspective views of the foldable creeper of FIG. 7, showing a locking member pivoting between a storage configuration and a supporting configuration.
Figure 8B:
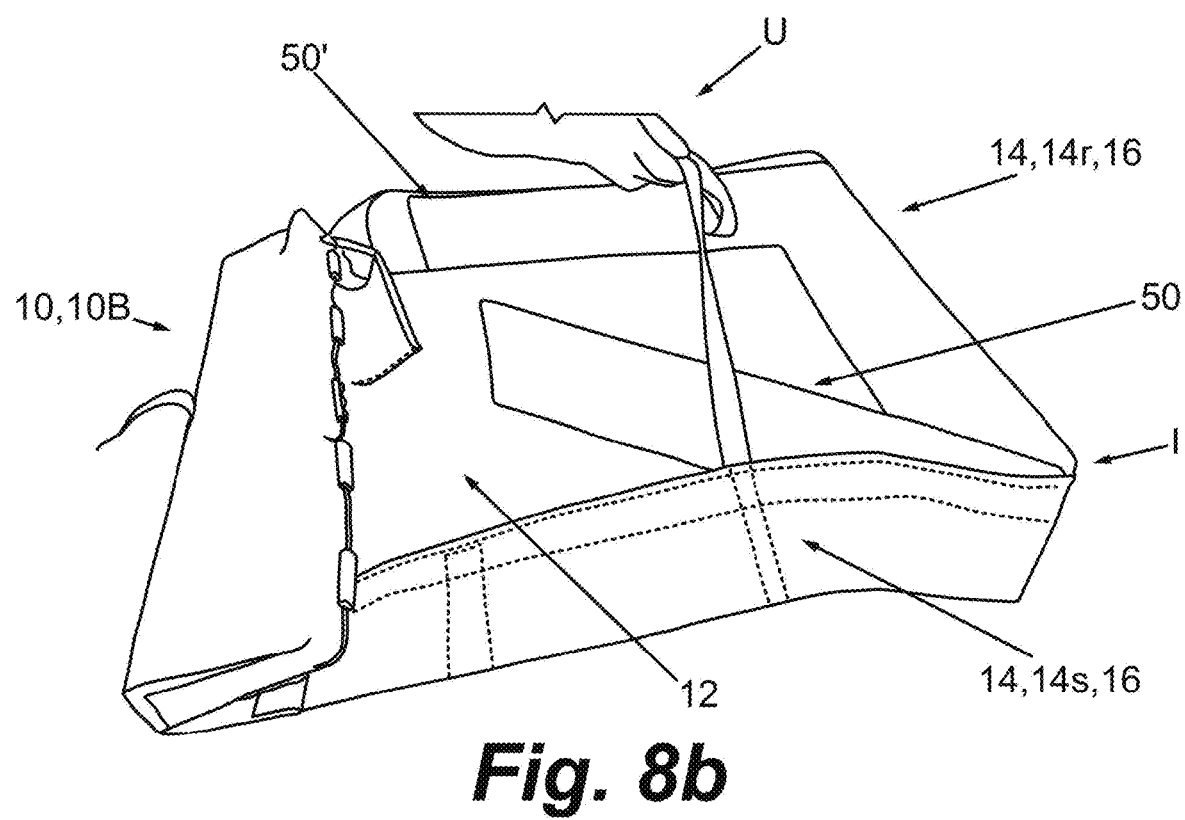

As with the previous embodiments, the body 10b of this embodiment preferably comprises a bottom 12 and an upturnable or raiseable circumferential wall 14, i.e. where wall 14 may be folded against the bottom (as can be seen in FIGS. 8a-8b) or upturned away from the bottom 12 (as can be seen in FIG. 7). The bottom 12 is preferably substantially planar when in the unfolded configuration. The bottom end of the circumferential wall 14 is preferably joined to (or integral with) the bottom 12, and it can form a substantially raised circumferential barrier 16 when in the unfolded configuration, i.e. when upturned, raised or "popped up" relative to the planar bottom 12; see FIG. 7.

Preferably the body 10b is constructed from a flexible and foldable material which is water-proof and suitable to contain water, oil and other liquids that may drain or leak out of motor vehicles. The circumferential wall 14 further comprises a first or front-end portion 14*f* (at the front end 10*f*), a second or rear-end portion 14*r* (at the rear end 10*r*), a first side wall 14*s* and a second side wall 14*s*'. Preferably, the side walls 14*s*, 14*s*' run along an axis that is substantially parallel to the folding axis A, and substantially perpendicular to the front-end portion 14*f* and rear-end portion 14*r*. Additionally, when the creeper 10 is in the unfolded configuration, the front-end portion 14*f*, rear-end portion 14*r* and side walls 14*s*, 14*s*' are raised (upturned or pivoted) relative to the bottom 12 and cooperate to form the circumferential raised barrier 16 around the periphery of said bottom 12. The bottom 12 and the circumferential raised barrier 16, cooperate to provide a liquid catching basin 20

As with the previous embodiments, it is to be understood that if sufficient tension was provided to the circumferential wall 14 of this embodiment, it can be maintained in a raised position (relative to the bottom 12) and maintain the substantially raised circumferential barrier 16 to thereby provide the liquid catching basin 20. As with the previous embodiments, a single rigid panel member is preferably provided in, or on, each of the front-end and rear-end portions 14*f*, 14*r* of the circumferential wall 14, extending substantially along said front-end and rear-end portions 14*f*, 14*r* between the side walls 14*s*, 14*s*'.

However, in this embodiment to further assist the circumferential wall 14 in forming and maintaining the substantially circumferential raised barrier 16 (when the creeper 10 is in the unfolded configuration), the creeper 10 preferably comprises locking members 50,50' which are elongated (relative to the locking members of the previous embodiment) and which pivot between a storage configuration (wherein they are substantially parallel to the rear-end portion 14*r* and do not interfere with the folding of the creeper 10 along the folding axis A, see locking member 50' in FIG. 8*a*) and a supporting configuration (where they are substantially parallel to a side wall 14*s*, 14*s*' and function to maintain said sidewalls upright; see FIG. 7). Notably, this embodiment does not comprise any rigid panel members 30. Instead, each of the first and second side walls 14*s*, 14*s*' are supported and maintained upright (to form the raised barrier 16) by the elongated locking members 50,50' when they are in the supporting configuration.

Figure 8C:
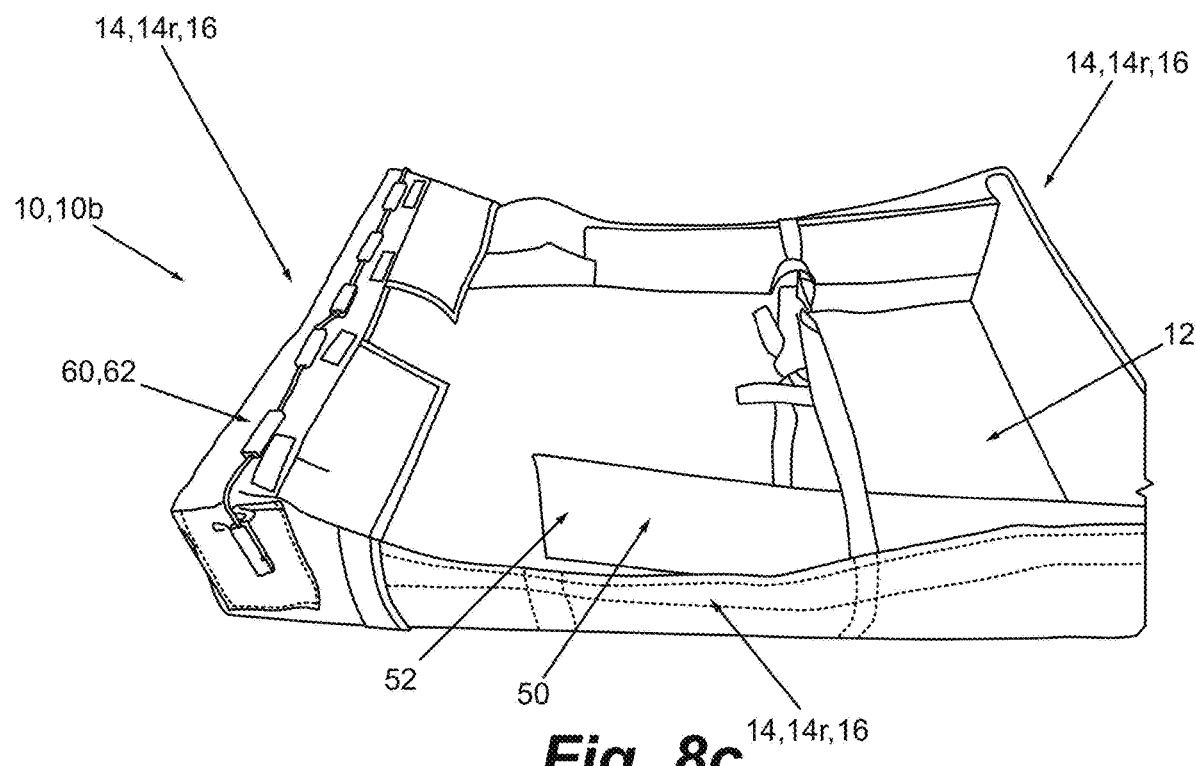

As shown in the drawings, elongated locking members 50,50' are attached in a conventional manner to the interior of the circumferential wall 14 at positions or interfaces 1,1' between the rear-end portion 14*r* and each respective side wall 14*s*, 14*r* (see FIG. 7). A removable attachment 52 means, such as a VELCRO™ brand hook and loop fastener, may be provided to retain the locking members 50 in the supporting configuration. FIGS. 8*a*-8*c* are perspective views of the foldable creeper of FIG. 7, showing a locking members 50, 50' pivoting between a storage configuration and a supporting configuration. Locking members 50, 50' preferably have a length that is substantially the same as (or at least 80% of) the interior width W (between respective side walls 14*s*, 14*s*') of the rear-end portion 14*r*. In a preferred embodiment, the creeper 10 is 38 inches in length (between front-end 10*f* and rear-end 10*r*), the interior width W is 28.5 inches, and the locking members are 24 inches in length. Advantageously, the creeper of this embodiment can be quickly set up from a folded configuration to an unfolded configuration (with the circumferential wall 14 in an upright position forming basin 20); i.e. by simply pivoting the locking members 50, 50' from the storage configuration to the supporting configuration.

Figure 9A:
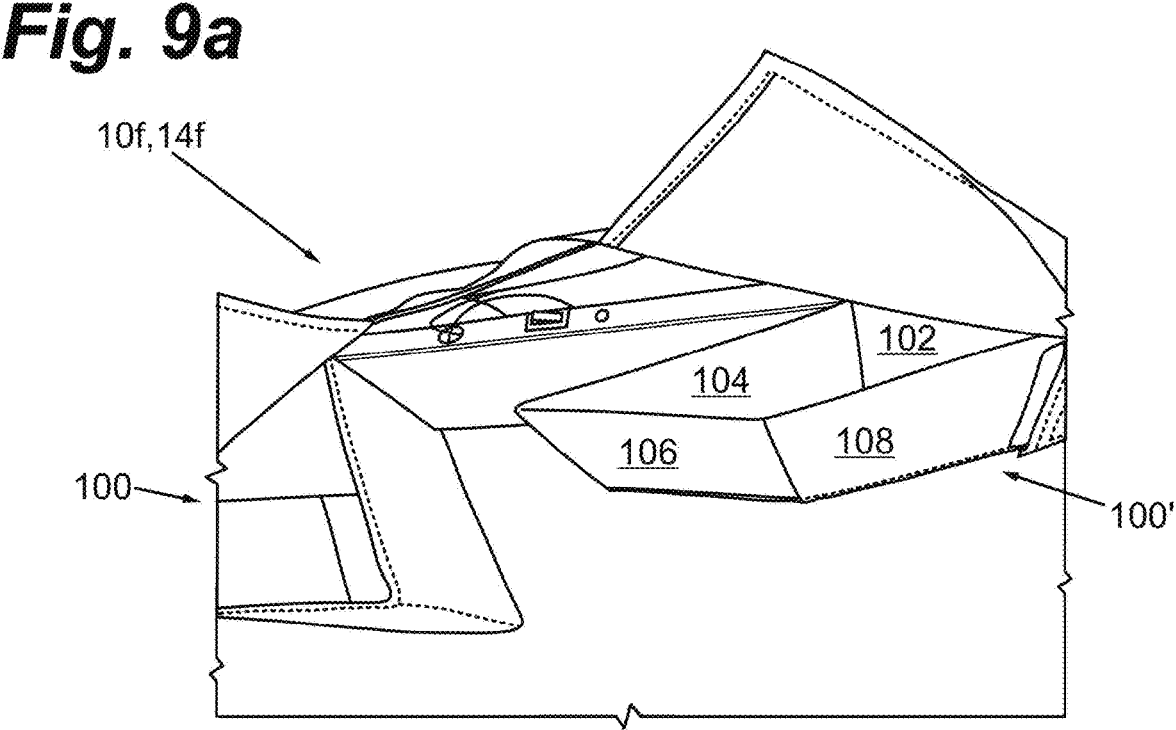
FIGS. 9a-9c are perspective views of the front end of the foldable creeper of FIG. 7, showing a folding shoulder support being folded or moved between a collapsed configuration and a shoulder supporting configuration.
Figure 9B:
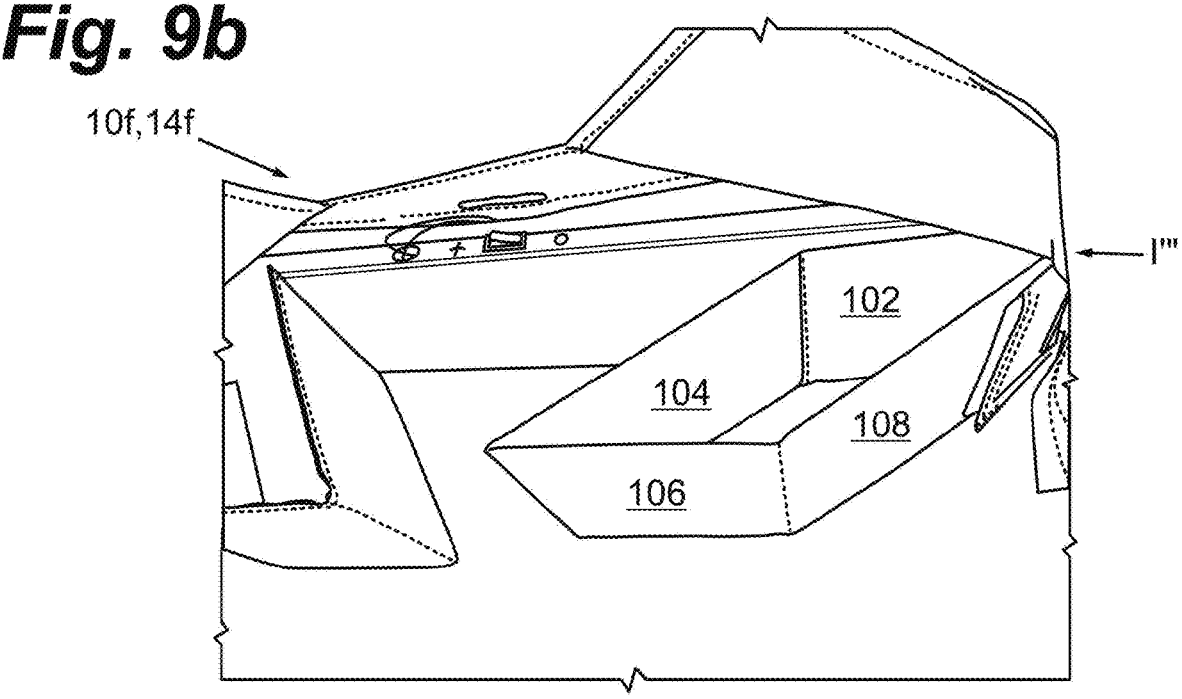
Figure 9C:
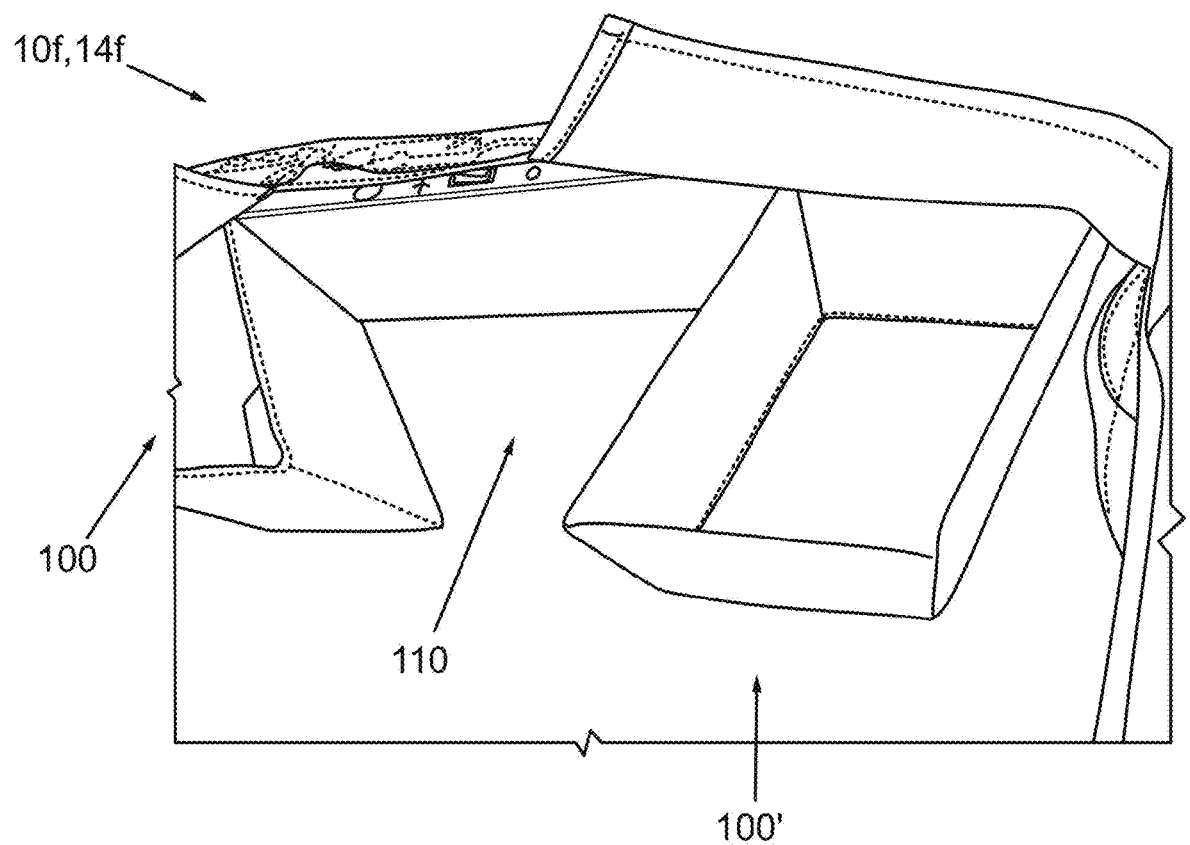
Figure 10:
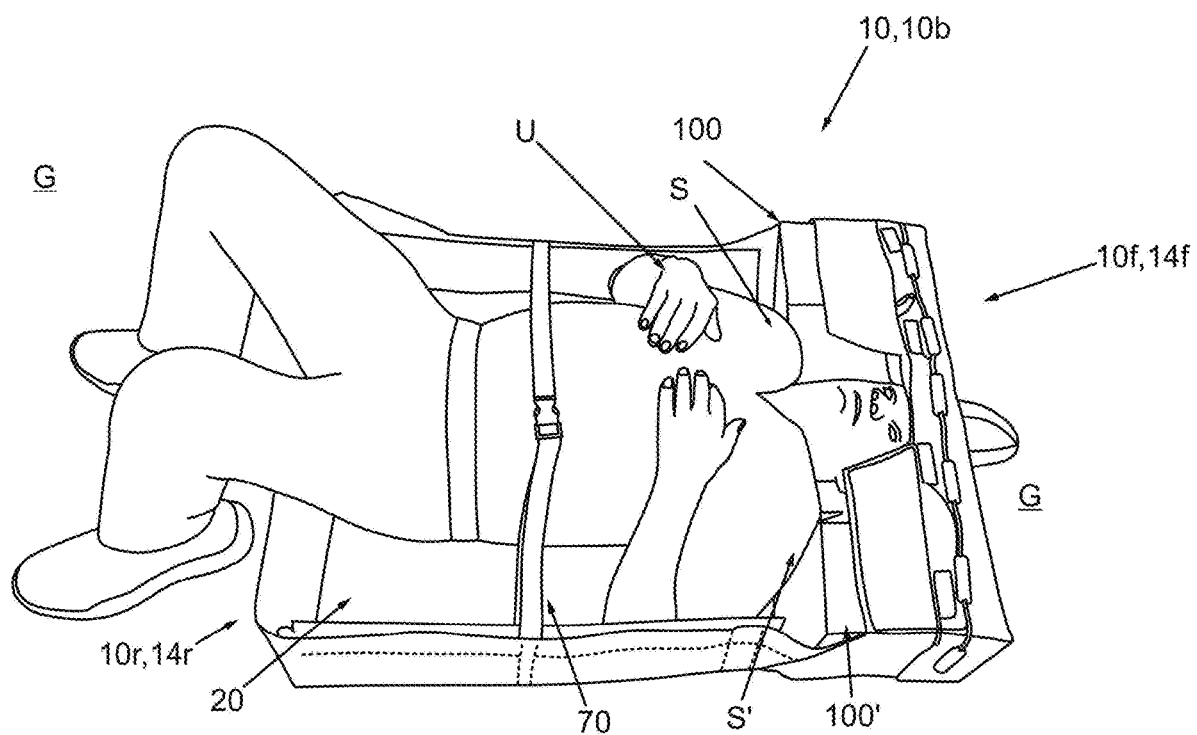
FIG. 10 is another perspective view of the foldable creeper of FIG. 7, shown in an unfolded configuration and in use by a user.

Preferably, the foldable creeper 10 of the embodiment of FIGS. 7-10 further comprises a pair of folding shoulder supports 100, 100' positioned in the interior of the creeper, each in a corner that is adjacent the front end 14*f* and adjacent each of the respective side walls 14*s*, 14*s*'; as shown in FIGS. 7 and 9*a*-10. The folding shoulder supports 100, 100' may be moved or folded between a collapsed configuration (FIG. 9*a*) and a shoulder supporting configuration (FIG. 10).

When the folding shoulder supports 100, 100' are in the shoulder supporting configuration a head recess or space 110 (of suitable dimensions to receive the head of a user) is preferably formed between the two folding shoulder supports 100, 100'. Moreover, when the folding shoulder supports 100, 100' are in the shoulder supporting configuration said folding shoulder supports 100, 100' can transfer at least some force exerted upon them by a user U (from the user's shoulders S, S') to the front end 14*f*. Advantageously, a user U can strap themselves into the creeper 10 using the strap or belt 70, extend their legs over the rear-end 10*r*, and push against the ground G with their legs and exert a force (via the user's shoulders S, S') which is then transmitted by the folding shoulder supports 100, 100' (when in the shoulder supporting configuration) to the front-end 10*f*, to move or advance the creeper 10 forward across the ground G (see FIG. 10).

When the folding shoulder supports 100, 100' are in the collapsed configuration, the folding shoulder supports 100, 100' are folded flat against the front-end portion 14*f*.

In a preferred embodiment, each of the folding shoulder supports 100, 100' further comprise a set of four shoulder panel members 102, 104, 106, 108 pivotally connected to each other in an end-to-end, loop-like fashion, and forming a parallelogram-like configuration when viewed from above (as shown in FIG. 9*c*). Preferably, one of the pivotal connections between a pair of shoulder panel members (e.g. pivotal connection between members 102 and 108) is attached or connected at a position or interface I",I''' between the front-end portion 14*f* and each respective side wall 14*s*, 14*r* (see FIG. 9*b*). When in the collapsed position, each of the four shoulder panel members 102, 104, 106 and 108 is in a position that is substantially parallel to the front-end portion 14*f* and they do not interfere with the folding of the creeper 10 along the folding axis A, see FIG. 9*a*.

The shoulder panel members 102, 104, 106, 108 may be comprised of cardboard, plastic, wood or other rigid material suitable to provide a solid support for each of a user's shoulders S, S', and to transmit force from a user to the front end 10*f* of the creeper. In a preferred embodiment, each shoulder panel member 102, 104, 106, 108 is 6 inches in height and between 6.5 to 9 inches in length. More preferably, the folding shoulder supports 100, 100' provide a head recess that is 9 or 10 inches in length (relative to the front-end 10*f*)

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The invention claimed is:
1. A foldable creeper (10) comprising:
   a foldable body (10*b*) comprised of a foldable material (M), having a first end (10*f*), a second end (10*r*) and foldable in a direction along a folding axis A;
   a bottom (12);

a raisable circumferential wall (14) having first end portion (14*f*), a second end portion (14*r*), a first side wall (14*s*) and a second side wall (14*s*'), said first and second side walls (14*s*, 14*s*') running along axes that are substantially parallel to the folding axis (A); and a first locking member (50) for supporting the first side wall (14*s*);

a second locking member (50') for supporting the second side wall (14*s*');

wherein the first end portion (14*f*), the second end portion (14*r*) and the first and second side walls (14*s*, 14*s*') are moveable relative to the bottom (12) and cooperate to form a circumferential raised barrier (16) around the periphery of said bottom 12 when the creeper (10) is in an unfolded configuration;

wherein the first and second locking members (50,50') are pivotable between a storage configuration and a supporting configuration; and wherein when the first and second locking members (50,50') are in the storage configuration said first and second locking members (50,50') are substantially parallel to the second end (14*r*) portion.

2. The foldable creeper (10) of claim 1 wherein the foldable material (M) is capable of containing water, oil and other liquids that may drain or leak out of a motor vehicle and wherein when in the unfolded configuration and used underneath the motor vehicle, the bottom (12) and the circumferential raised barrier (16) cooperate to create a liquid catching basin (20).

3. The foldable creeper (10) of claim 1 wherein when the first and second locking members (50,50') are in the supporting configuration said first locking member (50) is substantially parallel to said first side wall (14*s*) and said second locking member (50') is substantially parallel to said second side wall (14*s*').

4. The foldable creeper (10) of claim 3 wherein the locking members (50,50') are attached to an interior of the circumferential wall (14) at interfaces (I,I') between the second-end portion (14*r*) and each respective first and second side wall (14*s*, 14*s*').

5. A foldable creeper (10) comprising:

a foldable body (10*b*) comprised of a foldable material (M), having a first end (10*f*), a second end (10*r*) and foldable in a direction along a folding axis A;

a bottom (12);

a raisable circumferential wall (14) having first end portion (14*f*), a second end portion (14*r*), a first side wall (14*s*) and a second side wall (14*s*'), said first and second side walls (14*s*, 14*s*') running along axes that are substantially parallel to the folding axis (A); and a pair of folding shoulder supports (100, 100') positioned in the interior of the creeper, each positioned in a corner that is adjacent the first end portion (14*f*) and one of each of the respective first and second side walls (14*s*, 14*s*');

wherein the first end portion (14*f*), the second end portion (14*r*) and the first and second side walls (14*s*, 14*s*') are moveable relative to the bottom (12) and cooperate to form a circumferential raised barrier (16) around the periphery of said bottom 12 when the creeper (10) is in an unfolded configuration; and wherein the folding shoulder supports (100, 100') are movable between a collapsed configuration and a shoulder supporting configuration; and wherein each of the folding shoulder supports (100, 100') further comprise a set of four shoulder panel members (102, 104, 106, 108) pivotally connected to each other.

6. The foldable creeper (10) of claim 5 wherein when the folding shoulder supports (100, 100') are in the collapsed configuration, said folding shoulder supports (100, 100') are substantially parallel to the first end portion (14*f*).

7. The foldable creeper (10) of claim 5 wherein when the folding shoulder supports (100, 100') are in the shoulder supporting configuration, said folding shoulder supports (100, 100') can transfer at least some force exerted upon them by a user (U) to the first end portion (14*f*).

8. The foldable creeper (10) of claim 5 wherein one of the pivotal connections between a pair of shoulder panel members is connected at an interface (I'',I''') between the first end portion (14*f*) and one of said side walls (14*s*, 14*r*).

9. A foldable creeper (10) comprising:

a foldable body (10*b*) comprised of a foldable material (M), having a first end (10*f*), a second end (10*r*) and foldable in a direction along a folding axis A;

a bottom (12);

a raisable circumferential wall (14) having first end portion (14*f*), a second end portion (14*r*), a first side wall (14*s*) and a second side wall (14*s*'), said first and second side walls (14*s*, 14*s*') running along axes that are substantially parallel to the folding axis (A);

a first locking member (50) for supporting the first side wall (14*s*);

a second locking member (50') for supporting the second side wall (14*s*'); and a pair of folding shoulder supports (100, 100') positioned in the interior of the creeper, each positioned in a corner that is adjacent the first end portion (14*f*) and one of each of the respective first and second side walls (14*s*, 14*s*');

wherein the first end portion (14*f*), the second end portion (14*r*) and the first and second side walls (14*s*, 14*s*') are moveable relative to the bottom (12) and cooperate to form a circumferential raised barrier (16) around the periphery of said bottom 12 when the creeper (10) is in an unfolded configuration;

wherein the first and second locking members (50,50') are movable between a storage configuration and a supporting configuration; and wherein the folding shoulder supports (100, 100') are movable between a collapsed configuration and a shoulder supporting configuration; and wherein each of the folding shoulder supports (100, 100') further comprise a set of four shoulder panel members (102, 104, 106, 108) pivotally connected to each other.

\* \* \* \* \*